US008770900B1

(12) United States Patent
Schmidt

(10) Patent No.: US 8,770,900 B1
(45) Date of Patent: Jul. 8, 2014

(54) PLANING TOOL FOR PILINGS

(71) Applicant: Harold F Schmidt, Colts Neck, NJ (US)

(72) Inventor: Harold F Schmidt, Colts Neck, NJ (US)

( * ) Notice: Subject to any disclaimer, the term of this patent is extended or adjusted under 35 U.S.C. 154(b) by 0 days.

(21) Appl. No.: 13/888,469

(22) Filed: May 7, 2013

(51) Int. Cl.
*B23B 51/04* (2006.01)
*B23B 51/08* (2006.01)

(52) U.S. Cl.
CPC .................................... *B23B 51/08* (2013.01)
USPC ........................... 408/206; 408/203.5; 408/30

(58) Field of Classification Search
CPC .......... B23B 5/16; B23B 5/161; B23B 5/167; B23B 5/168; B23B 51/0406; B23B 51/08; B23B 2215/72; B23B 2220/40; B27F 1/00
USPC ............ 408/30, 22, 24, 117, 118, 203.5, 204, 408/206, 207, 209, 224; 82/113, 128, 130; 409/313; 144/48.2, 219
See application file for complete search history.

(56) References Cited

U.S. PATENT DOCUMENTS 244,749 A * 7/1881 Hammond et al. ....... 408/241 R
2,779,361 A * 1/1957 McKiff ......................... 408/204
3,220,449 A * 11/1965 Franklin ...................... 408/192
4,078,622 A * 3/1978 Taylor-Myers .............. 175/404
8,353,645 B1 * 1/2013 Laun ............................ 408/225

FOREIGN PATENT DOCUMENTS

DE 3135850 A1 * 3/1983
EP 870561 A1 * 10/1998
JP 01058409 A * 3/1989
JP 2003103410 A * 4/2003
JP 2007118501 A * 5/2007

OTHER PUBLICATIONS

Machine Translation of JP 2003-103410, paragraph [0004].*

* cited by examiner

*Primary Examiner* — Daniel Howell
*Assistant Examiner* — Nicole N Ramos
(74) *Attorney, Agent, or Firm* — Stuart M. Goldstein

(57) ABSTRACT

A piling planing tool utilizes a cylindrical cutter head connected to a cylindrical cutter ring having teeth for planing the outer surfaces of damaged or deteriorating in situ pilings. Spacer rings are attached between the cutter head and cutter ring to lengthen the planing tool, in order to extend the tool to plane lower outer surfaces of the pilings. A drill bit extends through the planing tool to bore center channels into the pilings. A circular cutting blade is provided beneath the cutter head to plane the top of the piling. The method of reforming in situ pilings utilizes the planing tool to shape pilings so that they can be connected with new pilings. The pilings are connected by an internal steel rebar and sleeve, permanently secured with bonding material to form a single reformed piling having high tensile strength.

10 Claims, 8 Drawing Sheets

PLANING TOOL FOR PILINGS

FIELD OF THE INVENTION

The present invention relates to the reconditioning and reformation of old or deteriorating in situ pilings, especially timber pilings, and, more particularly, to a piling planing tool for this purpose and a unique method of utilizing the tool to reform and recondition pilings to connect new pilings.

BACKGROUND OF THE INVENTION

Pilings are utilized in a variety of different environments and for many uses, e.g. in marine environments for supporting and reinforcing piers and vessel docking structures, in the construction industry for supporting and framing buildings, for structure supporting foundations, and supporting and maintaining raised homes and buildings in flood prone areas.

Regardless of the environment or context, pilings, which routinely and advantageously are wood or timber pilings, will eventually erode, deteriorate, rot or otherwise become damaged as a result of the passage of time, weather, wear and tear, wave and tidal action in marine situations, insect infestations, battering, etc. In many cases, the lower, less exposed section of the piling sustains far less damaged, since it is often not directly effected by weather, it is imbedded in the ground and/or, in marine circumstances, may have cathodic protection. As a result, when deterioration of or damage to the upper section of a piling has become very severe, even though the piling's lower section is in tact, the piling must be repaired or totally replaced.

This is especially significant where pilings are relied upon to maintain and support homes and buildings above ground in shore communities, near oceans, lakes or rivers. In these areas, damage from flooding often damages the upper sections of support pilings, requiring pile replacement.

However, total replacement of pilings is an expensive and involved process, especially in marine environments. Even the repair of pilings is quite costly and time consuming, since these types of repairs usually involve the construction of a wall, cofferdam, or like barrier around the piling, with the subsequent removal of ambient water, in order to provide a dry space in which to work.

These time-consuming processes and their resulting expense are exacerbated when major catastrophes create the need to address numerous piling failures. Property damage, such as occurred as a result of superstorm Sandy in 2012, highlights the need for effective, efficient, and economical means to repair deteriorated and partially destroyed pilings. Such is needed not only to connect in situ pilings to new pilings in routine situations, e.g. docks, piers, docking stations, etc., but also for emergent construction, for instance to renew damaged pilings which support raised homes and other building structures in flood plague locations. In fact, new government requirements since Sandy, require existing homes, buildings, and other shoreside structures to be built on timber pilings, raised to new elevations of up to three feet or more.

SUMMARY OF THE INVENTION

It is thus the object of the present invention to provide a planing tool for reforming, reshaping, remediating and otherwise preparing a damaged, worn or deteriorated in situ piling for connection to a new piling and for utilizing existing pilings to support elevated structures.

It is a further object of the present invention to provide effective and economical methods for piling remediation using the planing tool of the invention.

These and other objects are accomplished by the present invention, a rotating piling planing tool utilizing a unitary cylindrical cutter head connected to a corresponding cylindrical cutter ring having downstanding teeth for planing the outer surfaces of damaged or deteriorating in situ pilings. Spacer rings are attached between the cutter head and cutter ring to lengthen the planing tool, in order to extend the tool to plane lower outer surfaces of the pilings. A drill bit is secured to and extends through the planing tool to bore a center channel into the piling. A circular cutting blade is provided beneath the cutter head to shave and plane the top surface of the piling. The method of reforming the piling utilizes the rotating planing tool to shape the in situ piling so that it can be connected with a new piling. The pilings utilize an internal steel rebar and are connected by means of a connection sleeve, permanently secured with epoxy or other bonding material to form a single reformed piling having high tensile strength.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
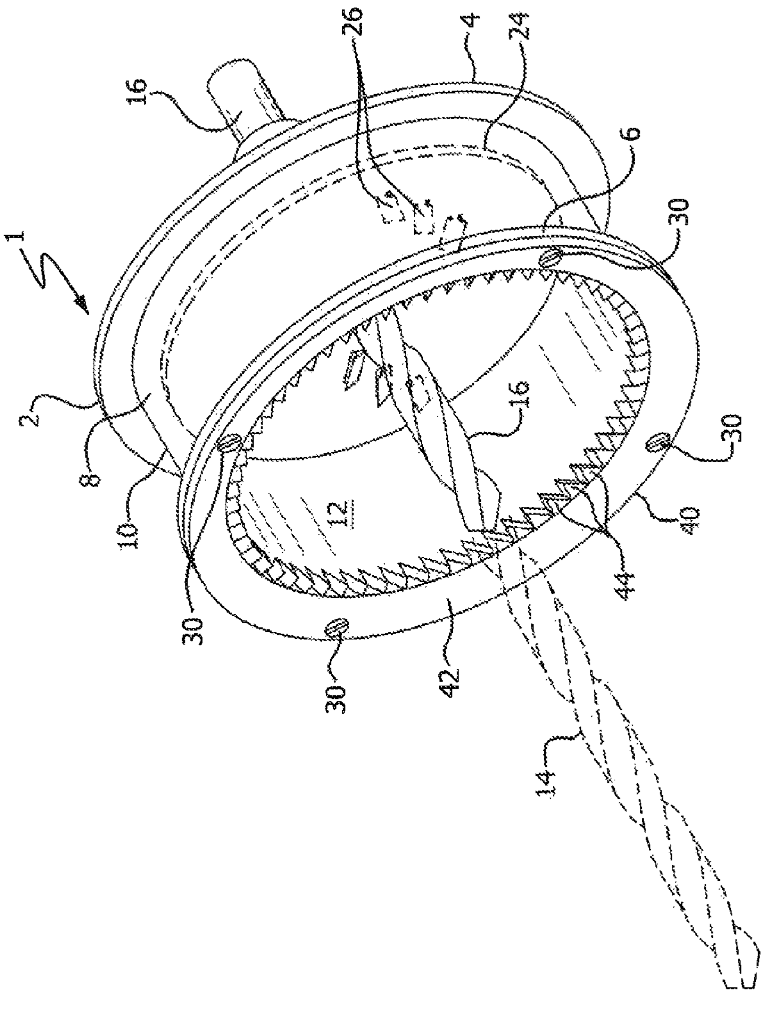
FIG. 1 is a bottom isometric view of the planing tool of the present invention, without spacer rings attached.
Figure 2:
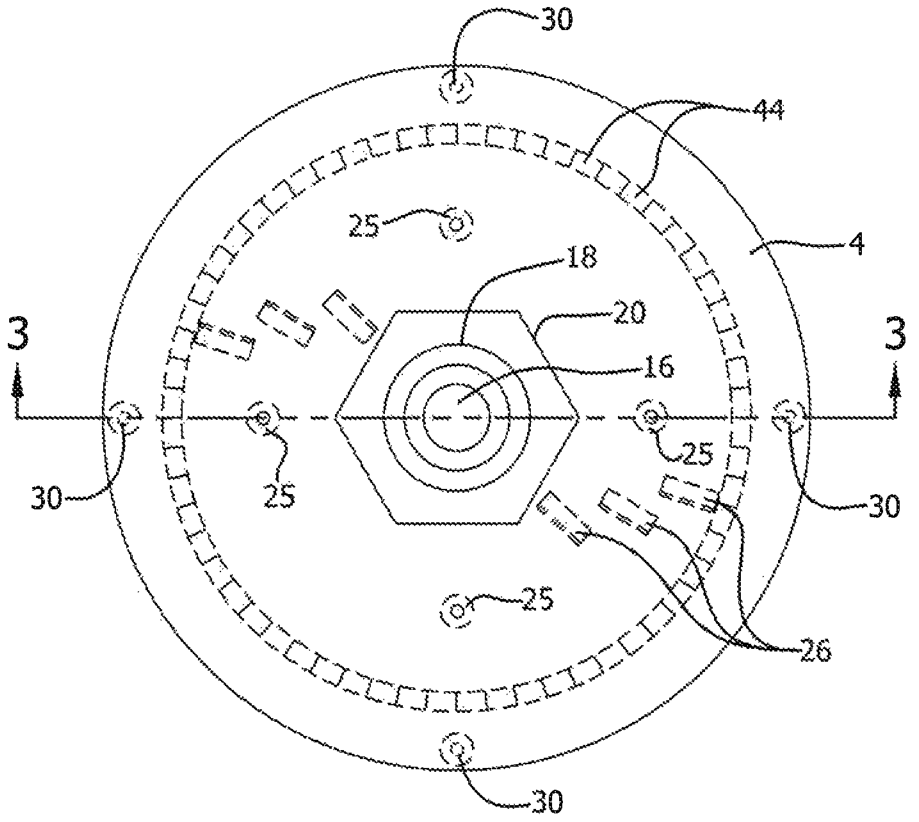
FIG. 2 is a top view of the planing tool of the present invention.

Piling planing tool 1 of the present invention comprises unitary, cylindrically shaped cutter head 2 having circular top wall 4, bottom circular ring 6, and circular middle section 8, with sidewall 10 extending between the top wall and bottom ring. Top wall 4 and bottom ring 6 each extend past sidewall 10 of middle section 8. Top wall 4 and middle section 8 encompass internal space 12 which extends through bottom ring 6. Cutter head 2 has an open bottom. For purposes of context, it is contemplated that the height of cutting head 2, from its top wall 4 to bottom ring 6, will be approximately four to six inches.

Drill bits 14 and 16, sized to be in excess of one inch in diameter, extend through top wall 4 and into and out of internal space 12. Longer drill bit 14 is initially utilized in the method of the invention, and is replaced by smaller drill bit 16 during the later steps of the method, as will be described hereinafter. The drill bits are secured to cutter head 2 by means of motive power connection means, e.g. mandrel 18/lock nut connection 20, on the top surface of top wall 4. Drill bits 14 and 16 are configured to be attached to a power motive means, e.g. feed mag drill 22, which raises, lowers, and rotates the bits, as well as the other components of planing tool 1. For purposes of context, it is contemplated that drill bit 14 will be approximately 30-36 inches long and drill bit 16 will be approximately four to six inches long. However, the dimensions of the drill bits are not to be considered restricted to those stated herein.

Piling planing means, e.g. circular flat cutting blade 24, with downwardly extending cutting teeth 26 on the lower surface of the blade, is located parallel to and below top wall 4, in internal space 12. Blade 24 is secured to top wall 4 by screws 25 extending from the top wall. Blade 24 has an opening through which drill bits 14 and 16 extend and is mounted perpendicularly to the drill bits.

Bottom ring 6 has openings for the insertion of screws 30 which attach cutter head 2 to cutter ring 40, as shown in FIG. 1, and subsequently to spacer rings 60*a* and 60*b*, as described below.

Second planing means, e.g. cutter ring 40, comprises circular outer rim 42 having an inner circular edge with downwardly extending planing teeth 44 circumferentially located within the outer rim of the cutter ring. Outer rim 42 has openings for the insertion of screws 30 which attach cutter ring 40 to cutter head 2, as shown in FIG. 1, and subsequently to spacer rings 60*a* and 60*b*, as described below.

As shown in detail in FIG. 3, extension means, e.g. spacer rings 60*a* and 60*b*, are configured to lengthen planing tool 1, during the pile connection method described hereinafter. Spacer rings 60*a* and 60*b* comprise circular top rings 62*a* and 62*b* and circular bottom rings 64*a* and 64*b*, interconnected by circular middle sections 66*a* and 66*b*, and internal spaces 68*a* and 68*b*. The top and bottom rings of spacer rings 60*a* and 60*b* extend past middle sections 66*a* and 66*b* and each has openings for the insertion of screws 30 which attach spacer ring 60*a* to cutter head 2, screws 31 which attach spacer ring 60*a* to spacer ring 60*b*, and screws 32 which attach spacer ring 60*b* to cutter ring 40.

As will be described hereinafter with regard to the piling connection method, the length of planing tool 1 will be changed, as the method progresses, by attaching additional spacer rings to the planing tool. It is contemplated that, for purposes of the herein method, planing tool 1, with cutter head 2, cutter ring 40, and two spacer rings 60*a* and 60*b* attached, will reach a length of approximately 30-36 inches, but such is not to be considered so restrictive. It should be understood that additional spacer rings could be added if there is a need to extend the length of the planing tool.

Figure 3:
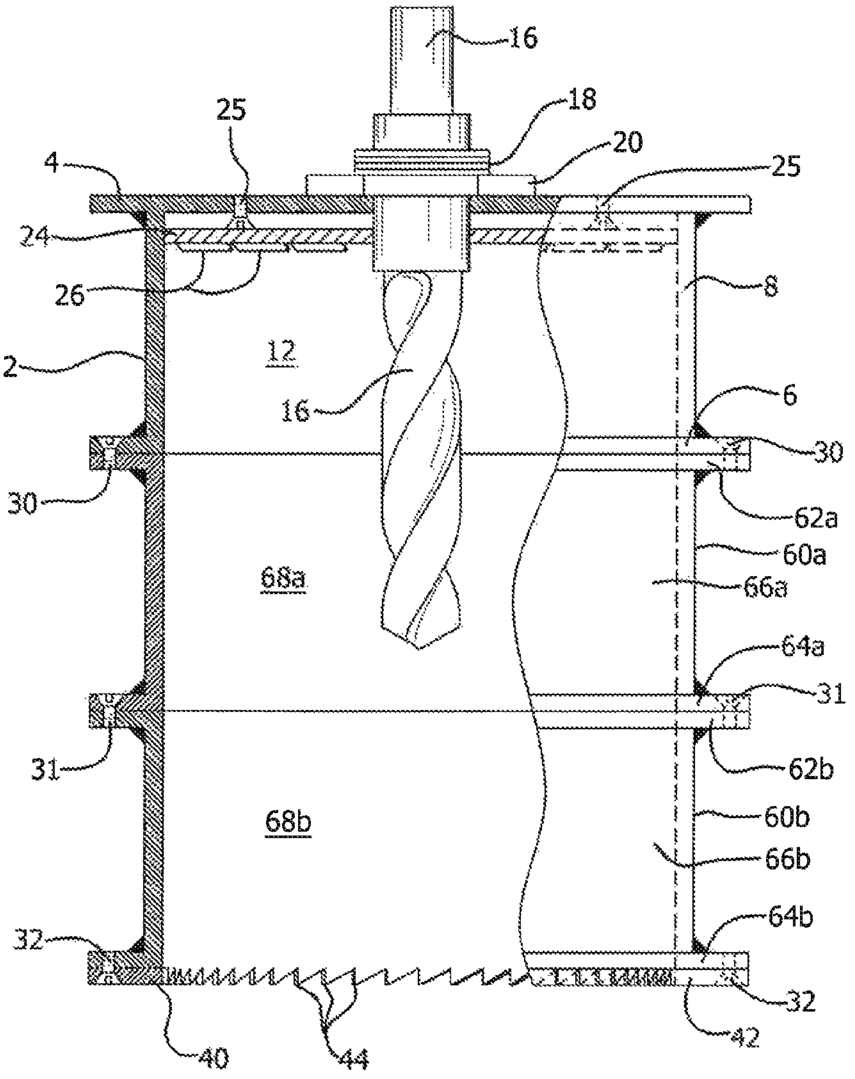
FIG. 3 is a partial cross-sectional view of the planing tool of the present invention, taken from FIG. 2, with spacer rings attached.
Figure 5:
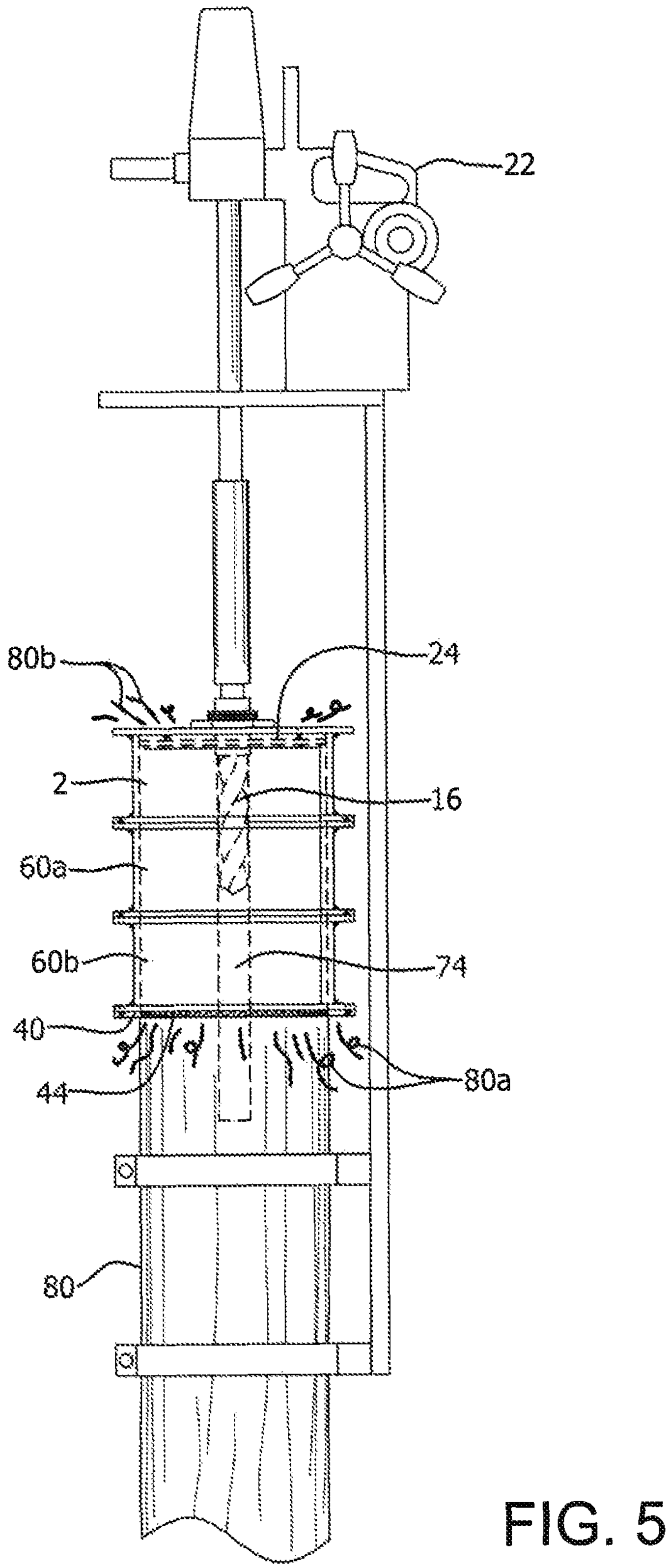

For example, FIGS. 3 and 5 show planing tool 1 with cutter head 2 attached to spacer ring 60*a*, spacer ring 60*a* attached to spacer ring 60*b*, and spacer ring 60*b* attached to cutter ring 40. Drill bit 16 extends partly through the components making up planing tool 1, as is described below.

The dimensions of planing tool 1 are critical and contribute to its uniqueness, in that the tool must be capable of encircling an in situ piling and of planing a significant length of the outer surface of the piling in order to accomplish the piling remediation method of the invention. As such, planing tool 1 is an integral component in the basic piling connection method of the present invention.

Figure 4:
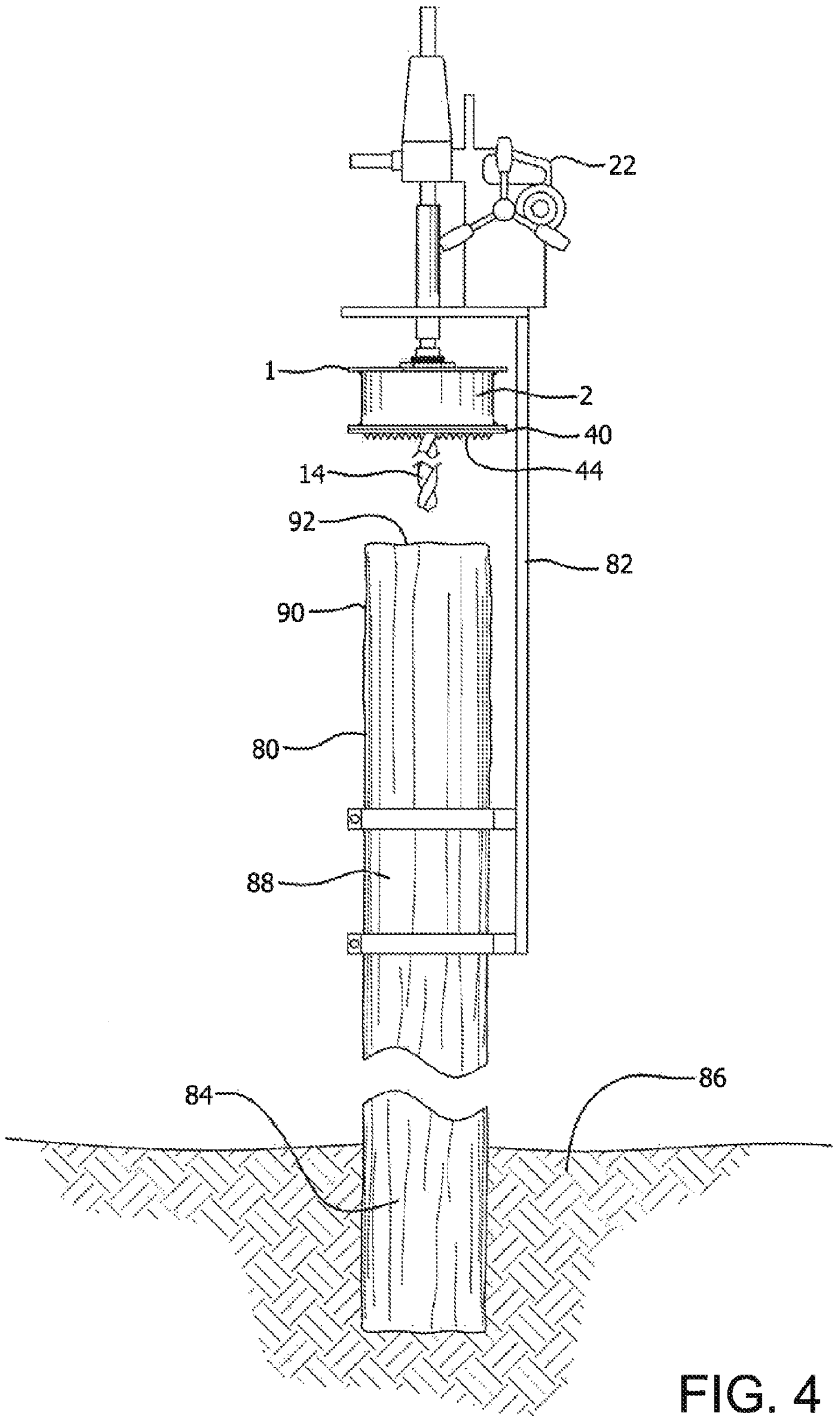
FIGS. 4-6 depict the steps of the method of the present invention.

As seen in FIG. 4, planing tool 1 is attached to feed mag drill 22, which itself is maintained on existing, in situ piling 80, by support bracketing 82 or an equivalent support. Lower portion 84 of piling 80 is imbedded into the ground or seabed 86, depending on the targeted environment. Upper portion 88 extends above ground and, as a result of age, ambient conditions, wear and tear, and similar deteriorating factors, has rough, worn and uneven outer surface 90 and top surface 92. Again as shown in FIG. 4, planing tool 1 is initially positioned over top surface 92 of piling 80, with longer drill bit 14 centered over the piling. At this initial stage, planing tool 1 is comprised of cutter head 2 connected directly to cutter ring 40 by screws, as previously described.

Feed mag drill 22 is actuated to lower and then rotate cutting tool 1 at high speed, e.g. 100-1000 RPM. As the bitter end of rotating drill bit 14 contacts top surface 92 of piling 80, it begins boring center channel 74 (see FIG. 5) through the piling. When rotating cutter ring 40 reaches piling 80, its circumferential rotating planing teeth 44 begin planing outer surface 90 of the piling. When cutting blade 24 contacts top surface 92 of piling 80, it begins shaving and planing the top surface, thus smoothing the top surface.

After outer surface 90 of piling 80 is planed for a distance equal to the height of planing tool 1, with cutter head 2 and cutter ring 40 attached, rotation of the cutting tool is halted and it is lifted above the piling by feed mag drill 22. Cutter ring 40 is detached from cutter head 2 and one or more of the spacer rings 60*a* and 60*b* are inserted between and attached to the cutter ring and cutter head by screws in the top and bottom rings of the spacer rings and to the cutter ring and cutter head, as previously described. At this point, drill bit 14 has bored center channel 74 into piling 80 to the requisite depth to perform the method. Drill bit 14 is now removed and replaced with smaller bit 16, e.g. one which is shorter than the current length of planing tool 1. Drill bit 16 now serves to assist in the stability of planing tool 1 as it continues to plane outer surfaces 90 of piling 80.

After planing tool 1 has been lengthened with space rings 60*a* and 60*b*, feed mag drill 22 is again actuated to lower and rotate the cutting tool and its rotating cutter head 2 with rotating cutting ring 40 to continue planing outer surface 90 of piling 80, thus shaving off outer surface pieces 80*a*, and, by means of cutting blade 24, planing off top surface pieces 80*b*.

Figure 6:
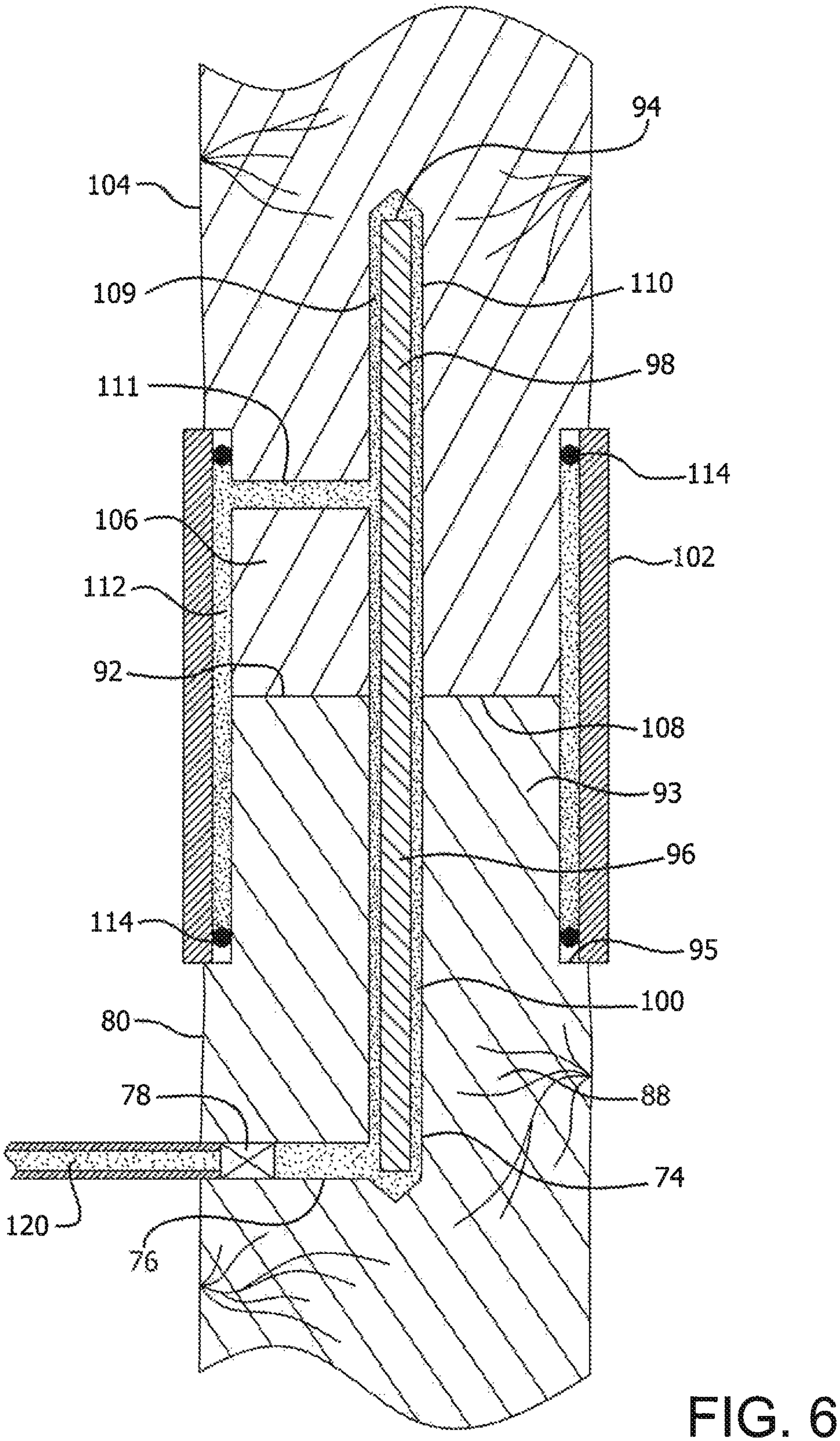

The process of planing outer surface 90, by adding spacer rings 60*a* and 60*b* as previously described, continues until smooth milled piling section 93 is created. Milled piling section 93 has a diameter less than the diameter of piling 80 (see FIG. 6), and lip surface 95 is formed along the top end of the upper portion 88 of the piling 80. Piling 80 has been planed such that its milled section 93 is a given length, typically approximately two feet. Piling 80 now comprises milled section 93, smooth top surface 92, and internally bored channel 74. Another channel 76 can now be drilled from the side of piling 80, laterally, into channel 74, as seen in FIG. 6. One way check valve 78 is installed within channel 76. Piling 80 has now been prepared to be connected to a new piling.

Towards that end, steel rebar 94 is inserted into channel 74 of piling 80, such that a first section 96 of the rebar extends within the channel and a second section 98 extends out of the piling. Space 100 is created between channel 74 and rebar 94. Cylindrical connection sleeve 102 is placed over milled section 93 of piling 80, optimally resting on lip 95. In this position, rebar 94 extends upward and out of sleeve 102 as well.

New piling 104 is provided having milled bottom section 106 with smooth bottom surface 108, the milled section having a diameter substantially equivalent to the diameter of milled section 93 of piling 80. Piling 104 also has internal center channel 110 substantially equivalent in diameter to channel 74 in piling 80. Channel 111 extends from the side of piling 104 into internal center channel 110.

Second section 98 of rebar 94 is inserted into channel 110 of piling 104, as bottom surface 108 of this piling is positioned on top surface 92 of piling 80, such that the outer surfaces of the pilings are in contiguous alignment and connection sleeve 102 extends over milled section 106 of piling 104 as well as milled section 93 of piling 80. Space 109 is created between rebar 94 and channel 110. By this placement, connection sleeve 102 is located around and between pilings 80 and 104, with space 112 created between the pilings and the connection sleeve.

Bonding material, such as high strength epoxy 120, is next injected into channel 76, through one way check valve 78. As the injection continues, bonding material 120 flows through channels 74 and 110, the spaces 100 and 109 around rebar 94, and into channels 111 and space 112. "O" rings 114 at the ends of sleeve 102 serve to seal and contain the bonding material within sleeve 102.

Bonding material 120 is allowed to harden within the channels and spaces. When fully hardened, pilings 80 and 104 are securely bonded and rigidly connected. Existing in situ piling 80 has been effectively salvaged and reformed. It has also been materially strengthened, to withstand both compressive and, especially, tensile forces.

Figure 7:
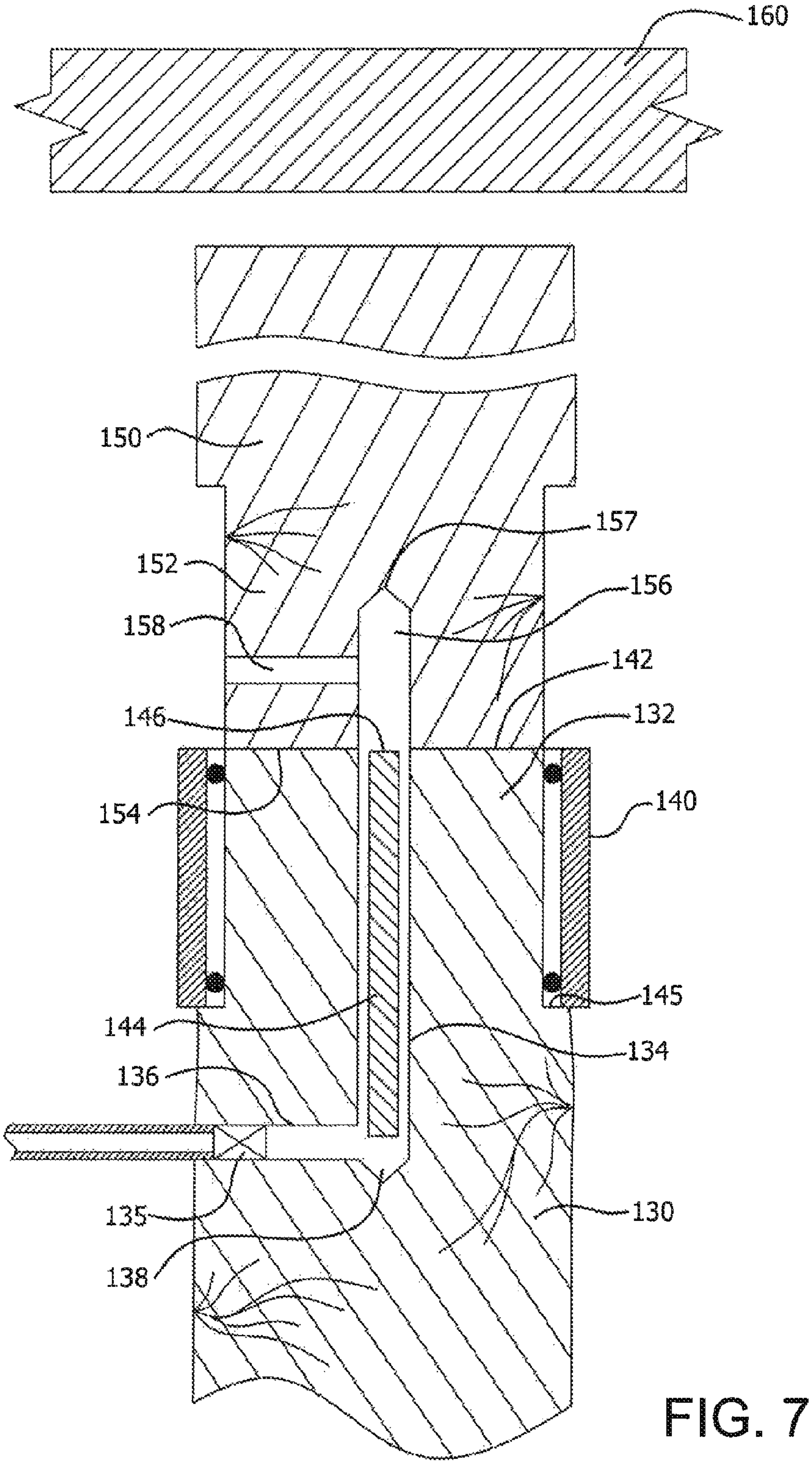
FIG. 7-8 depict the steps of an alternate method of the present invention.
Figure 8:
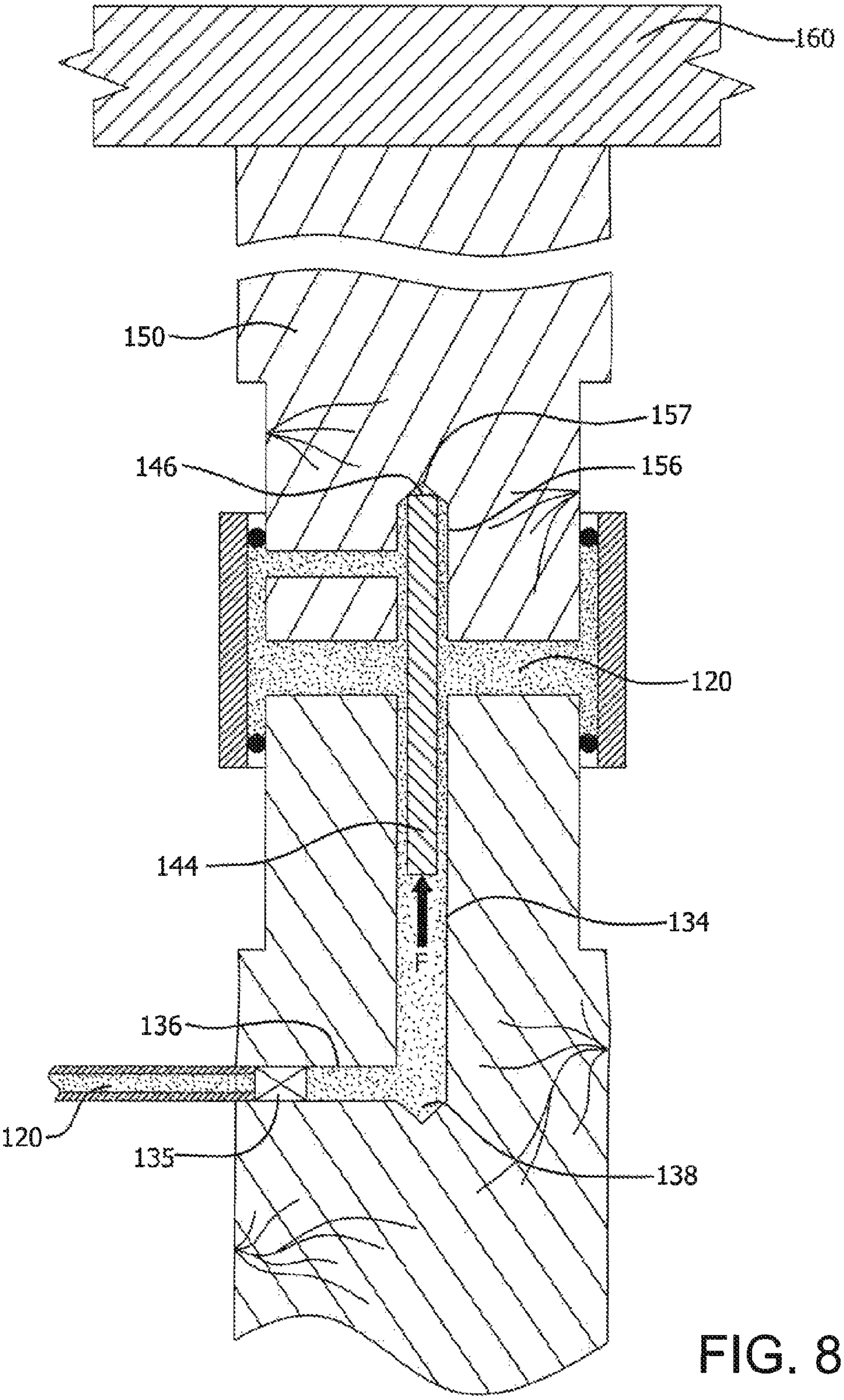

FIGS. 7 and 8 illustrate the piling connection method of the present invention, utilized to reform an in situ piling, especially timber pilings, located beneath an existing overhead structure, and to connect it to a new piling which, with the original piling, can support the structure without the need to move the structure. The method contemplates the steps described above, specifically the milling of in situ piling 130 to create milled section 132 and drilling internal channel 134. Channel 136 is bored through the side of piling 130, terminating at the bottom end 138 of channel 134. One way check valve 135 is provided in channel 136. Connection sleeve 140 is positioned on lip surface 145 of piling 130. However, rebar 144 is inserted into channel 134 such that top 146 of rebar 144 is below top surface 142 of piling 130.

New piling 150 is then provided, having milled bottom section 152 with smooth bottom surface 154, the milled section again having a diameter substantially equivalent to the diameter of milled section 132 of piling 130. Piling 150 also has internal channel 156 substantially equivalent in diameter to channel 134. Channel 156 has top end 157. Channel 158 extends from the side of piling 150 into channel 156.

As has been described with regard to the prior method, bottom surface 154 of piling 150 is then placed on top surface 142 of piling 130, such that the outer surfaces of the pilings are in contiguous alignment and connection sleeve 140 remains over milled section 132 of piling 130.

For this method, bonding material 120 is injected into channel 136, through check valve 135, and into the bottom end 138 of channel 134. As bonding material 120 flows primarily under rebar 144, the rebar is first raised within channel 134 and then within channel 156 of piling 150. Rebar 144 continues to be lifted and raised by bonding material 120 being continually injected, and forced upward F, until the rebar contacts top end 157 of channel 156. At this point, as bonding material continues to be injected, rebar 144 within channel 156, causes piling 150 to be raised and lifted up until it contacts existing structure 160.

As bonding material fills the channels and spaces within pilings 130 and 150, as previously described, piling 150 is continually compelled against structure 160. Injection of bonding material 120 is stopped after all spaces are filled and piling 150 is forced tight, up against existing structure 160. When bonding material 120 is fully hardened in the spaces within pilings 130 and 150, the pilings are rigidly connected to form an effective supporting structural component for the existing structure.

Of course, the lengths of the newly added piling, its internal channel, and the rebar must be coordinated and measured to ensure that when the new piling is fully raised and extended from the in situ piling, the connected pilings equate to the height which will effectively fit tightly under and support the existing structure.

By this method, new support pilings can be effectively installed below existing structures, without the need to move the structure or attempt to calculate and try to "fit" new pilings between in situ piling and structures. The method also provides a means of driving timber pilings under existing structures in relatively short segments by use of compact pile driving equipment. Currently, there is no way to drive piles where there are overhead height limitations due to the length of traditional timber piles. Foundation technology currently in use under raised buildings in flood zones requires expensive and relatively ineffective masonry construction.

The unique piling connection method of the present invention, regardless of the environment in which it is used, provides an effective, relatively economically means of reforming old pilings, especially when compared to existing methods. The method is readily adaptable to a wide variety of uses. Significantly, it results in a renovated piling structure which has very high tensile strength, which results in pilings which can withstand potentially destructive forces, both natural and man made.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A planing tool for reforming the surfaces of in situ pilings, said tool comprising:

a unitary circular cutter head having a top wall, an open bottom, an internal space, and first planing means mounted within the space, secured below and parallel to the top wall, for shaving and smoothing the top surface of an in situ piling, said first planing means comprising a circular planing blade mounted in the internal space, below the top wall, said blade having material planing teeth on its bottom surface;

second planing means connected to the cutter head for shaving the outer surface and reducing the diameter of an in situ piling;

planing tool extension means for increasing the length of the planing tool;

attachment means for connecting the second planing means to the cutter head and the extension means;

drilling means extending from the top wall into the internal space for boring a channel into the piling, said drilling means extending perpendicularly to the circular planing blade; and motive power connection means for securing the planing tool to power means for rotating the planing tool, and its cutter head, first and second planing means, and the planing tool extension means.

2. The planing tool as in claim 1 wherein the second planing means comprises a cutter ring with material cutting planing teeth extending around a circumference of the cutter ring.

3. The planing tool as in claim 1 wherein the attachment means comprises ring connections between the cutter head and the planing tool extension means, between the cutter head and the second planing means, and between the second planing means and the planing tool extension means.

4. The planing tool as in claim 1 wherein the planing tool extension means comprises multiple spacer rings aligned with the cutter head and second planing means, for attachment with the cutter head and second planing means.

5. The planing tool as in claim 1 wherein the drilling means comprises a drill bit in excess of one inch in diameter.

6. A planing tool for reforming the surfaces of in situ pilings, said tool comprising:

a unitary circular cutter head having a top wall, an open bottom, an internal space, and a circular planing blade mounted within the space, secured below and parallel to the top wall, for shaving and planing the top surface of an in situ piling, said planing blade having material planing teeth on its bottom surface;

a cutter ring with material cutting planing teeth extending around a circumference of the cutter ring for planing the outer surface of an in situ piling to reduce the diameter of the piling;

attachment means for connecting the cutter ring to the cutter head;

drilling means extending from the top wall into the internal space for boring a channel into the piling, said drilling means extending perpendicularly to the planing blade; and motive power connection means for securing the planing tool to power means for rotating the planing tool, and its cutter head, cutter blade, and cutter ring.

7. The planing tool as in claim 6 further comprising at least one spacer ring for increasing the length of the planing tool, aligned with and attached to the cutter head and the planing ring.

8. The planing tool as in claim 6 further comprising multiple spacer rings for increasing the length of the planing tool, the spacer rings aligned with and attached to the cutter head and the cutter ring.

9. The planing tool as in claim 6 wherein the drilling means comprises a drill bit in excess of one inch in diameter.

10. A planing tool for reforming the surfaces of in situ pilings, said tool comprising:

a unitary circular cutter head having a top wall, an open bottom, an internal space, and first planing means mounted within the space, secured below and parallel to the top wall, for shaving and smoothing the top surface of an in situ piling;

second planing means connected to the cutter head for shaving the outer surface and reducing the diameter of an in situ piling;

planing tool extension means for increasing the length of the planing tool, said planing tool extension means comprising at least one spacer ring aligned with the cutter head and second planing means for attachment to the cutter head and second planing means;

attachment means for connecting the second planing means to the cutter head and the extension means;

drilling means extending from the top wall into the internal space for boring a channel into the piling, said drilling means extending perpendicularly to the first planing means; and motive power connection means for securing the planing tool to power means for rotating the planing tool, and its cutter head, first and second planing means, and the planing tool extension means.

* * * * *